(12) United States Patent
Chen et al.

(10) Patent No.: US 7,912,060 B1
(45) Date of Patent: Mar. 22, 2011

(54) PROTOCOL ACCELERATOR AND METHOD OF USING SAME

(75) Inventors: Jian-Guo Chen, Basking Ridge, NJ (US); Cheng Gang Duan, Shanghai (CN); Nevin C. Heintze, Bethlehem, PA (US); Hakan I. Pekcan, Basking Ridge, NJ (US); Kent E. Wires, Mine Hill, NJ (US)

(73) Assignee: Agere Systems Inc., Allentown, PA (US)

( * ) Notice: Subject to any disclaimer, the term of this patent is extended or adjusted under 35 U.S.C. 154(b) by 1260 days.

(21) Appl. No.: 11/384,975

(22) Filed: Mar. 20, 2006

(51) Int. Cl.
*H04L 12/56* (2006.01)

(52) U.S. Cl. ........ 370/392; 370/231; 370/412; 370/229; 370/235

(58) Field of Classification Search .................. 370/231, 370/412, 392
See application file for complete search history.

(56) References Cited

U.S. PATENT DOCUMENTS

| | | | |
|---|---|---|---|
| 5,243,596 A * | 9/1993 | Port et al. ...................... | 370/231 |
| 5,371,877 A | 12/1994 | Drako et al. | |
| 5,553,269 A | 9/1996 | Nunes | |
| 5,659,687 A | 8/1997 | Kim et al. | |
| 5,937,169 A | 8/1999 | Connery et al. | |
| 5,974,482 A | 10/1999 | Gerhart | |
| 6,233,224 B1 * | 5/2001 | Yamashita et al. ............ | 370/231 |
| 6,434,651 B1 * | 8/2002 | Gentry, Jr. .................... | 710/260 |
| 6,449,656 B1 | 9/2002 | Elzur et al. | |
| 6,453,394 B2 | 9/2002 | Miki et al. | |
| 6,643,259 B1 * | 11/2003 | Borella et al. ................ | 370/231 |
| 6,697,868 B2 | 2/2004 | Craft et al. | |
| 6,732,252 B2 | 5/2004 | Miki et al. | |
| 6,788,704 B1 | 9/2004 | Lindsay | |
| 6,868,459 B1 | 3/2005 | Stuber | |
| 6,876,941 B2 | 4/2005 | Nightingale | |
| 6,885,673 B1 * | 4/2005 | Tzeng et al. .................. | 370/412 |
| 6,920,510 B2 | 7/2005 | Chang et al. | |

(Continued)

FOREIGN PATENT DOCUMENTS

EP 1691526 * 8/2006

OTHER PUBLICATIONS

Paxson, "computing TCP's retransmission timer", Nov. 2006.*
ARM, AMBA AXI Protocol v 1.0 Specification, Copyright 2003, 2004, 108 pages.
Tanenbaum, Andrew S., Structured Computer Organization, 1984, Prentice-Hall, Inc., pp. 10-12.

(Continued)

*Primary Examiner* — Dang T Ton
*Assistant Examiner* — Pamit Kaur
(74) *Attorney, Agent, or Firm* — Mendelsohn, Drucker, & Associates, P.C.; Craig M. Brown; Steve Mendelsohn

(57) ABSTRACT

In some examples, a protocol accelerator extracts a queue identifier from an incoming packet, for identifying a first buffer queue in which the packet is to be stored for transport layer processing. A packet having an error or condition is identified, such that the accelerator cannot perform the processing on that packet. A processor is interrupted. The identified packet is stored in a second buffer queue. The processor performs transport layer processing in response to the interrupt, while the accelerator continues transport layer processing of packets in the first buffer queue. In some examples, a TCP congestion window size is adjusted. A programmable congestion window increment value is provided. The window size is set to an initial value at the beginning of a TCP data transmission. The window size is increased by the increment value when an acknowledgement is received.

43 Claims, 6 Drawing Sheets

U.S. PATENT DOCUMENTS

| | | | |
|---|---|---|---|
| 6,938,097 B1 * | 8/2005 | Vincent et al. | 709/240 |
| 7,185,266 B2 * | 2/2007 | Blightman et al. | 714/776 |
| 2002/0038379 A1 * | 3/2002 | Sato et al. | 709/238 |
| 2002/0080780 A1 * | 6/2002 | McCormick et al. | 370/355 |
| 2003/0086395 A1 * | 5/2003 | Shanbhag | 370/331 |
| 2004/0042483 A1 | 3/2004 | Elzur et al. | |
| 2004/0133713 A1 | 7/2004 | Elzur | |
| 2004/0153578 A1 | 8/2004 | Elzur | |
| 2004/0165538 A1 * | 8/2004 | Swami | 370/252 |
| 2004/0249957 A1 | 12/2004 | Ekis et al. | |
| 2005/0021680 A1 | 1/2005 | Ekis et al. | |
| 2005/0165985 A1 * | 7/2005 | Vangal et al. | 710/107 |
| 2006/0161760 A1 * | 7/2006 | Jordan et al. | 711/205 |

OTHER PUBLICATIONS

ARM, Advanced High-Performed Bus (AHB), AMBA AHB, ARM IHI 0011A, © Copyright ARM Limited 1999, Chapter 3, pp. 3-1-3-54.

ARM, AMBA Specification, Rev. 2.0. ARM, 1999, 34 pages.

ARM, The Architecture for the Digital World, http://www.arm.com/contact_us/offices.html, Sep. 1, 2005.

ARM, The Architecture for the Digital World, http://www.arm.com/products/CPUs/, Sep. 1, 2005.

Information Sciences Institute University of Souther California, Transmission Control Protocol Darpa Internet Program Protocol Specification, Sep. 1981, pp. 1-88, Marina del Rey, California.

* cited by examiner

PROTOCOL ACCELERATOR AND METHOD OF USING SAME

FIELD OF THE INVENTION

The present invention relates to communications generally, and more specifically to communications processors and methods.

BACKGROUND

The continued development of computers and computer network hardware and the resulting increased processing speeds and data transmission rates have led to huge increases in the amount of data moved across such networks. While data transmission rates continue to increase, these large amounts of data must be handled by processors that are equally burdened by other tasks, all of which require increased processing power. One approach to addressing the increased processor workload stemming from increased data communications loads is to offload some of the data communications functions to dedicated hardware.

U.S. Pat. No. 6,697,868 discusses allocating common and time consuming network processes in a communications processing device, while retaining the ability to handle less time intensive and more varied processing on the host stack. Exception conditions are processed in a conventional manner by the host protocol stack. Most performance-impacting functions of the host protocols can be quickly processed by the specialized hardware while the exceptions are dealt with by the host stacks, the exceptions being sufficiently rare as to negligibly effect overall performance.

Improved methods and apparatus for offloading routine communications protocol processing tasks from the host processor are desired.

SUMMARY OF THE INVENTION

In some embodiments, a protocol accelerator extracts a queue identifier from at least one incoming packet, for identifying a first buffer queue in which the incoming packet is to be stored for transport layer processing by the protocol accelerator. A packet having an error or condition is identified, such that the protocol accelerator cannot perform the transport layer processing on the identified packet. A processor is interrupted. The identified packet is stored in a second buffer queue reserved for packets identified in the identifying step. The processor performs transport layer processing in response to the interrupt, while the protocol accelerator continues storage of other packets into the first buffer queue and transport layer processing of packets in the first buffer queue.

In some embodiments, a value of a field is set to one of a first value and a second value in a register of a transmission control protocol (TCP) accelerator. A TCP computation is performed in the TCP accelerator, if the value of the field is set to the first value. The TCP computation is performed in a programmed processor, if the value of the field is set to the second value.

In some embodiments, a transport control protocol (TCP) congestion window size is adjusted. A programmable congestion window increment value is provided. The TCP congestion window size is set to an initial value at the beginning of a TCP data transmission. The TCP congestion window size is increased by the programmable congestion window increment value when an acknowledgement packet is received.

DETAILED DESCRIPTION

This description of the exemplary embodiments is intended to be read in connection with the accompanying drawings, which are to be considered part of the entire written description.

In the description below, the terms, L2, L3 and L4 refer to level 2 (link layer), level 3 (network layer) and level 4 (transport layer) of the OSI reference model.

Figure 1A:
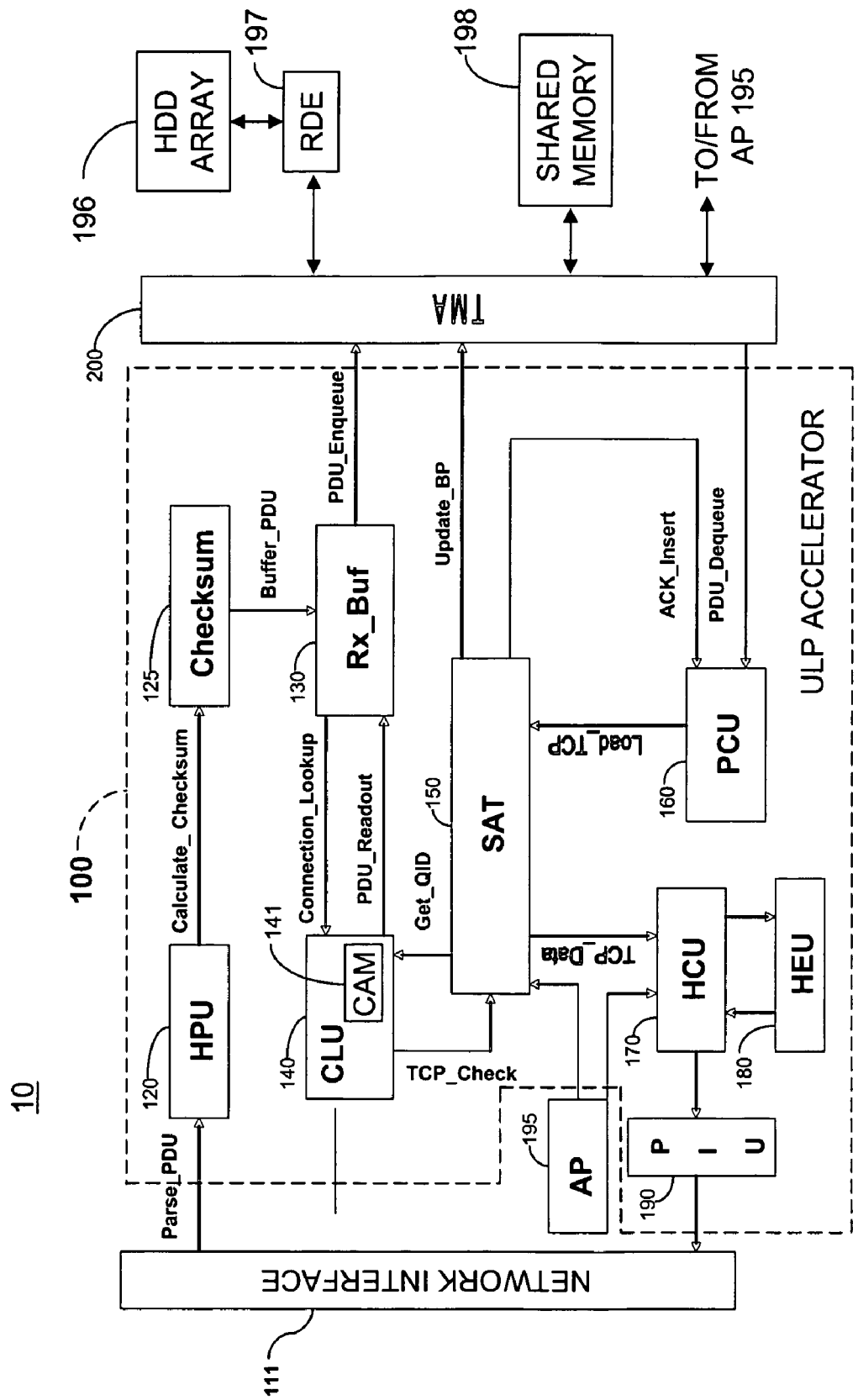
FIG. 1 is a block diagram of an exemplary home network attached server system.

FIG. 1A is a block diagram of an exemplary home network attached storage (HNAS) system 10. HNAS system 10 includes an upper layer protocol (ULP) accelerator 100 (e.g., a communications processor implemented in special purpose hardware). In the exemplary embodiment, ULP accelerator 100 offloads routine transmission control protocol/Internet protocol (TCP/IP) protocol processing from the host (referred to below as application processor, or AP 195). The TCP/IP processing may include IP Version 4 and Version 6, for example. ULP accelerator 100 may optionally support user datagram protocol (UDP), real-time transport protocol (RTP) and/or hypertext transport protocol (HTTP). In other embodiments (not shown), a ULP accelerator performs processing for one or more other protocol stacks, instead of TCP/IP.

ULP accelerator 100 performs routine, high frequency calculations and decisions in hardware (the "fast path") in real-time, and transfers infrequent, complex calculations and decisions to AP 195 (the "slow path"). Because the number of complex calculations and decisions transferred to AP 195 is relatively small, they have negligible impact on the processing load of AP 195. ULP accelerator 100 handles communication processing for most packets in hardware more quickly than AP 195 could process the same packets. Because ULP accelerator 100 handles a limited number of the more routine processing task types, the amount of special purpose hardware used to implement ULP accelerator 100 is relatively small.

In some embodiments, ULP accelerator 100 is implemented in application specific integrated circuits (ASIC). In some embodiments, the HNAS 10 (including ULP accelerator 100) is implemented as a system on chip (SOC). In other embodiments, ULP accelerator may be implemented using discrete components.

There are two separate data paths within HNAS system 10: a receive path and a transmit path. The receive path carries traffic from the network 111 or other external devices to HNAS system 10. The transmit path carries traffic in the opposite direction: from the disk array 196 to a peripheral device interface 114 or the network interface 113, by way of HNAS system 10. In the receive path, ULP accelerator 100 receives Ethernet packets from L1/2 processing block through the network interface 111 (e.g., Gigabit Ethernet Controller, GEC) or device interface (e.g., USB Controller) 112. The L3 and L4 header fields of each packet are extracted by ULP accelerator 100. A connection lookup is then performed. Based on the lookup result, ULP accelerator 100 makes a decision as to where to send the received packet. An arriving packet from a previously-established connection is tagged with a pre-defined Queue ID (QID) used by TMA 200 for traffic queueing purposes.

A packet from a new or unknown connection requires further investigation by AP 195. ULP accelerator 100 tags the packet with a special QID and routes the packet to AP 195. The final destination of an arriving packet after ULP accelerator 100 is either the disk array 196 for storage via a RAID decoder/encoder, RDE 197, (if the packet carries media content) or AP 195 for further investigation, if the packet carries a control message or the packet cannot be recognized by ULP accelerator 100. In any of the above cases, TMA 200 sends the packet to the external shared memory 198 controlled by TMA 200 for temporary buffering. In order to maintain certain streaming bandwidth, media data transferred over an established connection between the client (not shown) and HNAS server 10 in a so-called bulk data transfer is handled by hardware only without intervention by AP 195.

In the transmit data path, ULP accelerator 100 receives the data transfer request from TMA 200. The original source of data to be transferred may be a hard disk (for a media stream), AP 195 (for a control message) or ULP accelerator 100 itself (for a TCP acknowledgement packet). Regardless of the traffic source, ULP accelerator 100 encapsulates an Ethernet header, an L3 (IP) header and an L4 (TCP) header for each outgoing packet and then sends it to the transmit network interface 113 or transmit peripheral interface 114 based on the destination port specified.

Figure 1B:
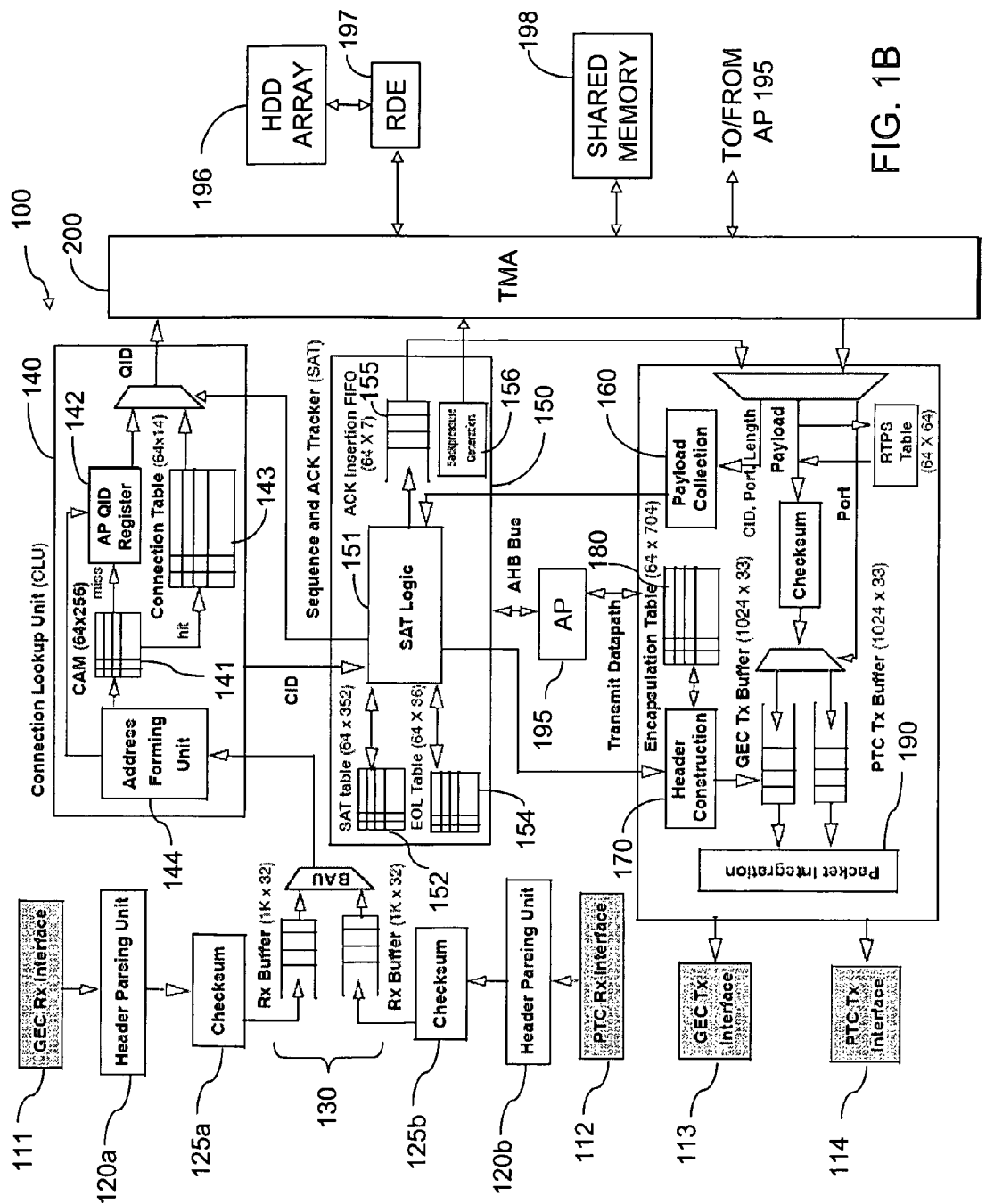

FIG. 1B is a block diagram of one implementation of ULP accelerator 100. It will be understood by those of ordinary skill in the art that FIG. 1B is just exemplary in nature, and other implementations are also contemplated. Items in FIG. 1B that are the same as items in FIG. 1A have the same reference numeral. TCP data packets are received and transmitted by way of a network interface 111, such as an Gigabit Ethernet interface or other LAN interface, or from the peripheral traffic controller (PTC) interface 112, which may include a USB or other peripheral device interface. Received network packets are first processed by Header Parsing Unit (HPU) 120a, which parses an incoming data packet from network interface 111 to determine where the L3 (IP) packet headers and L4 (TCP) packet headers start, and delineates the packet boundary between different protocol levels by parsing the packet content. Similarly, HPU 120b performs the same function for packets received via peripheral interface 112. Receive Checksum block 125a performs a layer 3 and layer 4 checksum on the incoming data packets from the network interface 111. The L3 and L4 checksum is calculated and compared with the received checksum for packet integrity. Checksum block 125b performs a similar function for packets received via the peripheral interface 112. Receive Buffer (Rx buffer) 130 stores the incoming packet in buffers, for use by ULP accelerator 100. A traffic manager/arbiter (TMA) 200 provides the interface to memory 198. A receive arbiter (not shown) multiplexes the received network data to the connection look-up unit (CLU) 140 with either strict priority or round-robin scheduling for handling priority traffic. CLU 140 extracts L3 and L4 fields to form a lookup address, and keeps the key parameters that uniquely identify an established connection. These parameters may include a Connection ID (CID) in a connection table 143 for use by AP 195 in locating buffer space in memory 198 for each connection.

Payload collection unit (PCU) 160 collects traffic from TMA 200 for transmission. Header Encapsulation Unit (HEU) 180 includes a table that includes a template of the L2, L3 and L4 headers to be added to each outgoing packet. Header Construction Unit (HCU) 170 builds the packet header according to the information from the encapsulation table in the HEU 180. Packet Integration Unit (PIU) 190 assembles a packet by combining packet header and payload to form the outgoing packet. FIGS. 1A and 1B also show AP 195, which is responsible for exception processing for unrecognizable data frames and out-of-sequence frames and for setting up variables for ULP accelerator 100 whenever a new connection is established.

The exemplary ULP accelerator 100 is also responsible for calculating and generating both L3 and L4 checksum fields for each direction. Other responsibilities of ULP accelerator 100 may include tracking sequence numbers and generating acknowledgment (ACK) packets for TCP connections.

In some embodiments, the CLU 140 uses the L3 and IA fields to form a look-up address for the CLU content addressable memory (CAM) 141. The CAM 141 stores key parameters which uniquely identify an established connection. In some embodiments, the fields stored in CAM 141 are user configurable. An index comprising matched CAM entries provides a CID for further look-up in a CLU connection table 143. The QID used by TMA 200 to identify a queue buffer is one of the CLU connection table parameters. Thus, the CAM allows real-time extraction of the QID within the hardware of ULP accelerator 100. If an incoming packet does not match an entry in CAM 141, the packet is passed to AP 195 for further investigation.

Sequence and Acknowledgement Tracker (SAT) 150 maintains a SAT Table 152 to track incoming packet sequence numbers and acknowledgement packets for received and transmitted data packets. The SAT table 152 can be used for TCP/IP connections. In other embodiments (not shown), SAT Table 152 can be used to perform similar functions for other connection-oriented protocols. SAT 150 is described in detail below, with reference to FIG. 5.

Special Case Handling: ULP Lookup Flags and Interrupt Generation

Given a normal packet stream, the exemplary ULP accelerator 100 performs the following functions:
  Packet header parsing;
  Connection lookup;
  Queue ID generation for TMA 200;
  Checksum generation and checking;
  TCP acknowledgment packet generation;
  Out-of-order packet detection through sequence number tracking;
  L3 and L4 header extraction and encapsulation;
  Backpressure handling in receive and transmit directions (where backpressure is a condition in which ULP accelerator 100 causes a transmitting device to hold off on sending data packets until a bottleneck in ULP accelerator 100 has been eliminated (e.g., when its buffers holding data have been emptied). In order to create backpressure, ULP accelerator 100 may either broadcast false collision detection signals or sends packets back to the originating device if the buffer is full.);
  Re-routing unrecognizable frames to AP 195 for further processing; and
  RTP header updating.

The exemplary ULP accelerator 100 is not designed to perform all communications protocol processing for every case that can be anticipated. Some events that conform to the TCP/IP protocol (e.g., establishing a completely new connection) are normal but infrequent, so little overall system performance improvement would be gained by including such normal but infrequent functions in ULP accelerator 100. Such functions are reserved for AP 195. Also, some abnormal situations can occur during the ULP lookup process. These abnormal situations include packet checksum error, invalid packet protocol, CAM lookup miss and packet arrival to a zero object length connection, or the like. An exemplary list of functions reserved for AP 195 includes:

Connection set up and tear down.

Connection management-related TCP acknowledgement packet creation and insertion.

Out of order packet processing.

Packet retransmission.

Setting initial threshold and congestion window size.

Fast recovery.

Fast retransmission of lost packets.

A packet is received with an invalid checksum

A packet is received with one or more of the Ethernet frame error flags set

A packet is received that caused Ethernet parsing error

A packet is received and caused an error in Address Forming unit 144

A packet is received with an URG, SYN, FIN, or RST flag set

An ACK is received for data outside of the send window (for data further ahead in the stream than has been sent)

An ACK packet is received with TCP or IP options

An IP fragment is received (IP fragmentation)

A Duplicate ACK received for a packet sent out earlier

An IPv6 packet with extended header is received

One of ordinary skill in the art understands that the allocation of functions to the fast path (processing by ULP accelerator 100) or the slow path (processing by AP 195) can be varied by the designer. In other embodiments, the allocations may differ from those listed above.

The exemplary ULP accelerator 100 can readily identify a packet having one of the conditions reserved for handling by AP 195 (e.g., an infrequent or erroroneous condition), and transfer the packet to AP 195 for handling, while allowing the ULP accelerator 100 to perform routine TCP processing for remaining packets in the same data transfer.

Figure 2:
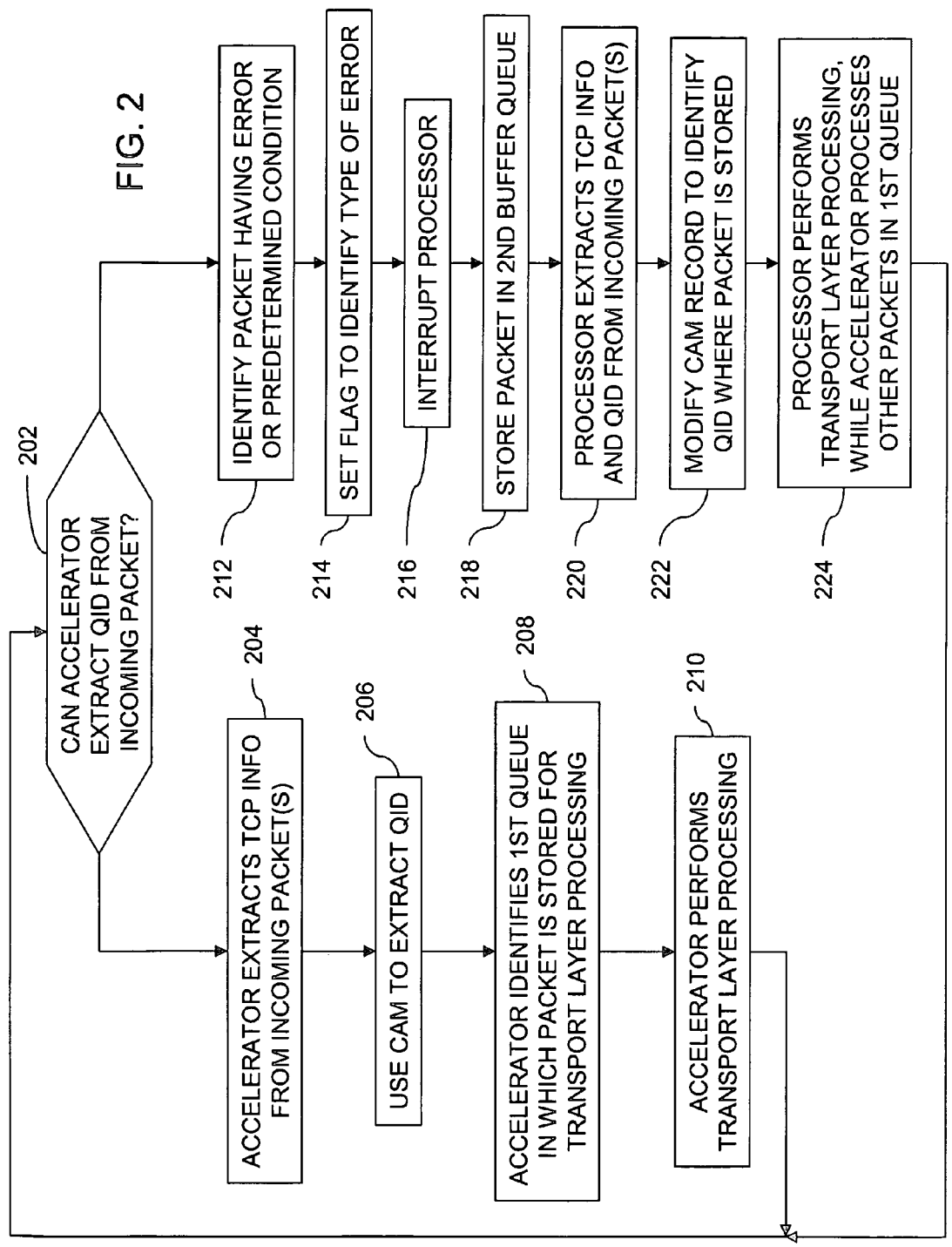
FIG. 2 is a flow chart of an exemplary method of allocating packet processing to hardware and software.

FIG. 2 is a flow chart showing an exemplary method for transferring a packet from the fast path (hardware in ULP accelerator 100) to the slow path (software in AP 195) for processing.

At step 202, ULP accelerator 100 determines whether it can extract the QID from an incoming packet. If ULP accelerator 100 can extract the QID, step 204 (fast path) is executed. If ULP accelerator 100 cannot extract the QID, step 212 (slow path) is executed.

At step 204, ULP accelerator 100 extracts TCP information from at least one incoming packet.

At step 206, a content addressable memory 141 may be used to extract the QID.

At step 208, ULP accelerator 100 identifies a buffer queue in which the incoming packet is stored for transport layer processing by using the QID derived through connection table lookup.

At step 210, the protocol accelerator performs transport layer processing. Afterward, the payload of packet is transferred to TMA 200. The payload of the packet can then be stored to disk or processed by the application processor, as appropriate.

After step 210, step 202 is again executed for the next incoming packet.

At step 212, ULP accelerator 100 identifies a packet having an error or condition such that the protocol accelerator cannot perform the transport layer processing on the identified packet. For example, ULP accelerator 100 may identify a packet for which a lookup error occurs while attempting to extract a queue identifier therefrom, or for which a matching QID is not present in the content addressable memory 141, or which is received out of sequence.

When one of the above-mentioned special cases occurs, ULP accelerator 100 cannot derive the QID by a CAM lookup procedure. ULP accelerator 100 either drops these packets or routes them to AP 195 using a special QID based on the configuration (as described with reference to steps 214-224, below).

At step 214, ULP accelerator 100 sets a flag in the packet to identify to AP 195 a type of lookup error identified in step 212.

At step 216, ULP accelerator 100 may issue an interrupt signal to AP 195, as appropriate.

At step 218, ULP accelerator 100 stores the identified packet in a buffer queue reserved for packets identified in step 212. The exemplary ULP accelerator 100 allocates the following three dedicated QIDs (special buffer queues) for case lookup:

Lookup_Error_QID—The QID used when there is a CAM lookup error or when a packet arrives at a zero object length connection.

CAM_Miss_QID—The QID used when the address formed does not match in CAM 141.

Out_of Sequence_QID—The QID used when an out-of-sequence packet is detected.

At step 220, AP 195 extracts transport layer protocol information from the packet.

AP 195 determines a QID of a buffer into which the packet identified in step 212 is to be stored.

At step 222, AP 195 will perform a variety of different operations depending on the analysis result. For example, AP 195 may modify a record of CAM 141 to identify the connection (QID) of the buffer in which the identified packet is stored. Subsequently, the buffer identified by that QID is used for transport layer processing of a later received packet related to the identified packet by ULP accelerator 100.

At step 224, AP 195 performs transport layer processing in response to the interrupt, while ULP accelerator 100 continues storage of other packets into the first buffer queue and transport layer processing of packets in the first buffer queue. In typical operations, ULP accelerator 100 may store many packets for the same data transfer in the first buffer queue for transport layer processing by the ULP accelerator 100. The plurality of packets may belong to a single data transfer, wherein the identified packet transferred to AP 195 for processing belongs to the same single data transfer.

The CLU 140 and SAT 150 provide a means for identifying a packet having an error or condition such that the circuitry of CLU 140 cannot perform the transport layer processing on the identified packet, and for generating and transmitting an interrupt signal to a processor. CLU 140 identifies CAM misses and lookup errors. SAT 150 identifies all detected TCP related errors, such as out-of-sequence or out-of-window packets, and the like.

Some embodiments have three types of special buffer queues allocated for the packets that ULP accelerator 100 cannot process. In some embodiments, there is only one lookup_error_QID and cam_miss_QID register 142 in ULP accelerator 100, but there is one out_of_sequence QID per connection. In the event of a lookup error or CAM miss, protocol accelerator 100 does not know to which connection the packet belongs, so it cannot determine whether the packet has been received out of sequence, to select the appropriate out_of_sequence QID. In some embodiments, these different special buffer queues are stored in different registers and tables. The hardware of both ULP accelerator 100 and TMA 200 allows the same QID value to be used for different types of buffer queues. For example, when one of the special cases handled by AP 195 occurs, ULP accelerator 100 also sets flags to reflect such result.

In some embodiments, address formation for an incoming packet includes three lookup stages in CAM 141, and ULP accelerator 100 sets flags for the following conditions:
  CAM miss in the second stage address forming
  CAM miss in the third stage address forming
  CAM miss in the CAM lookup
  Parsing Error These flags are carried in each packet's local header and prepended to the packet after the word with the start of header (SOH). In some embodiments, AP 195 determines whether to enable/disable the local header generation.

In some embodiments, ULP accelerator 100 is configured to discard a packet containing a protocol-related error. In one such embodiment, the packet is read out from the receive buffer Rx_Buf 130 as if it were a normal packet with the exception of not validating the transfer to TMA 200.

At any point during the data transfer to TMA 200, if ULP accelerator 100 is no longer able to handle the transfer, it returns control back to the TCP stack running on AP 195. Once AP 95, takes control of the processing for a connection, AP 195 controls whether each subsequent packet should be processed by the fast path or slow path, and controls the time when packet processing returns to the fast path. When AP 195 clears the valid bit in CAM 141, all subsequent packets destined for this connection are directed to AP 195, until AP 195 enables the entry in CAM 141 again. Also, a register 142 records the CID for the connections that caused the interrupt. If the CID is not known at the time of interrupt generation, that register is not updated. For example the exemplary ULP accelerator 100 cannot determine the CID if 'invalid checksum' or 'Ethernet frame errors' or 'Address Forming errors' are occurring.

If enabled, the local header carries some details of the source of the interrupt. Detailed information of the Ethernet framing related error conditions can be found from the internal registers of the Ethernet interface.

Exemplary system 10 includes an interrupt status register and a mask register. Another register 142 is reserved to store the corresponding CID when an interrupt occurs. This register 142 shows the latest interrupted CID until it is read by AP 195.

The following pseudocode explains an example of a means for setting the flags:
// detect if IP V6 has extended header, check TCP or UDP for IP V4 too
if (IP_version==6 AND (IP_Proto !=6 OR IP_Proto !=21))
    IPV6 Ext=TRUE;
// detect if IP V4 packet is fragment or not
else if (IP_version==4 AND (IP_Flag==0x4 OR IP_Flag==0x0 AND IP_Fragment_Offset !=0))
    Fragmented=TRUE;
Configurable Fast Path/Slow Path Options.

Figure 3:
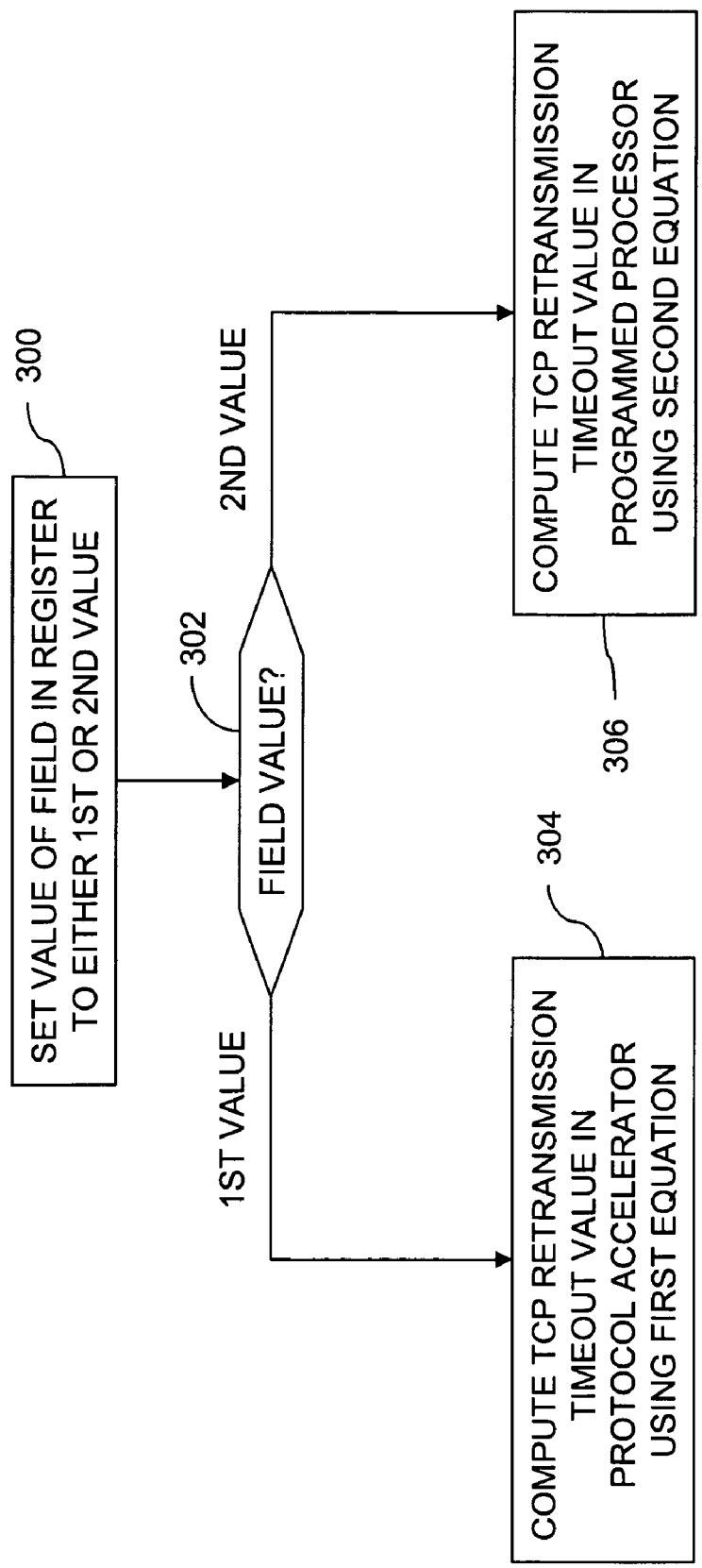
FIG. 3 is a flow chart of an exemplary method of programmable assignment of certain functions to either hardware or software.

Another feature of an exemplary ULP accelerator 100 is the capability to selectively perform some TCP functions either in hardware (i.e., application specific integrated circuit, ASIC) in real time, or in software in near real time. The FIG. 3 is a flow chart describing one example of this capability.

At step 300, a value of a field in a register of a transmission control protocol (TCP) accelerator 100 is set to one of a first value and a second value. In some embodiments, the programmed processor (AP 195) sets the value in the register.

At step 302, a determination of the value stored into the register is made at the time a TCP computation is to be performed.

At step 304, the TCP computation is performed in real time in the TCP accelerator if the value of the field is set to the first value.

At step 306, the TCP computation is performed in the programmed processor (AP 195) if the value of the field is set to the second value.

In an exemplary embodiment, the TCP computation that is performed by either the ULP accelerator 100 or AP 195 is the computation of a TCP retransmission timeout (RTO) value. SAT 150 provides means within accelerator 100 for performing a TCP computation within the TCP accelerator if the value of the field is set to the first value. The Retransmitting timer value (Re_Tx_Timeout) can be changed from fast path (ULP accelerator 100) to slow path (software in AP 195), or from slow path to fast path.

The TCP retransmission timeout (RTO) calculation is based on following rule:

$$RTTVAR = (1-\text{beta})*RTTVAR + \text{beta}*|MRTT - \text{Sampled } RTT| \quad (1)$$

$$MRTT = (1-\text{alpha})*MRTT + \text{alpha}*\text{Sampled } RTT \quad (2)$$

$$RTO = MRTT + \max(G, K*RTTVAR) \quad (3)$$

where:
  RTT is round trip time
  RTTVAR is the TCP round trip time variance,
  MRTT is the mean TCP round trip time,
  G is an indication of clock granularity of the hardware implementation; and
  Beta, alpha are constants.

In some embodiments, ULP accelerator 100 performs calculation (1) and (2) by maintaining respective values of RTTVAR and MRTT for each TCP connection.

For Equation (3), i.e., the final step to set RTO, some embodiments allow selection from two options, by setting a configuration bit in a register. The selection determines whether the computation of Equation (3) is performed by hardware or software.

For option 1, when the configuration bit is set, the hardware of ULP accelerator 100 updates the value of RTO based on Eq. (3), which allows the ULP accelerator 100 to track the RTO of TCP RTT dynamically in real time.

For option 2, when the configuration bit is not set, the hardware of ULP accelerator 100 does NOT update the value of RTO. Instead, AP 195 updates RTO.

The ability to selectively perform a calculation or decision in hardware or software provides flexibility in updating the RTO rule. For example, with the hardware of ULP accelerator 100 configured to perform the RTO calculation using the preferred algorithm (as of the time when system 10 is fabricated), system 10 can be put into service with the configuration bit set to compute RTO in real time in hardware. Should a preferred alternative calculation of RTO be identified at a later time, the configuration bit can be reset, to perform the RTO calculation in the application processor (AP 195) according to the alternative calculation in AP 195 in near-real time (instead of in real-time using the hardware of ULP accelerator 100).

Although an example is provided in which the configuration bit is used to select between hardware and software calculation of the RTO, one of ordinary skill can readily include a bit in the timer table to allow another TCP processing computation to be performed selectively in hardware or software. For example, this option may be made available for any routine, high frequency computation that is preferably done more quickly in hardware, but for which the preferred equation is likely to change during the lifetime of the system.

Sequence and Acknowledgement Tracking

Figure 5:
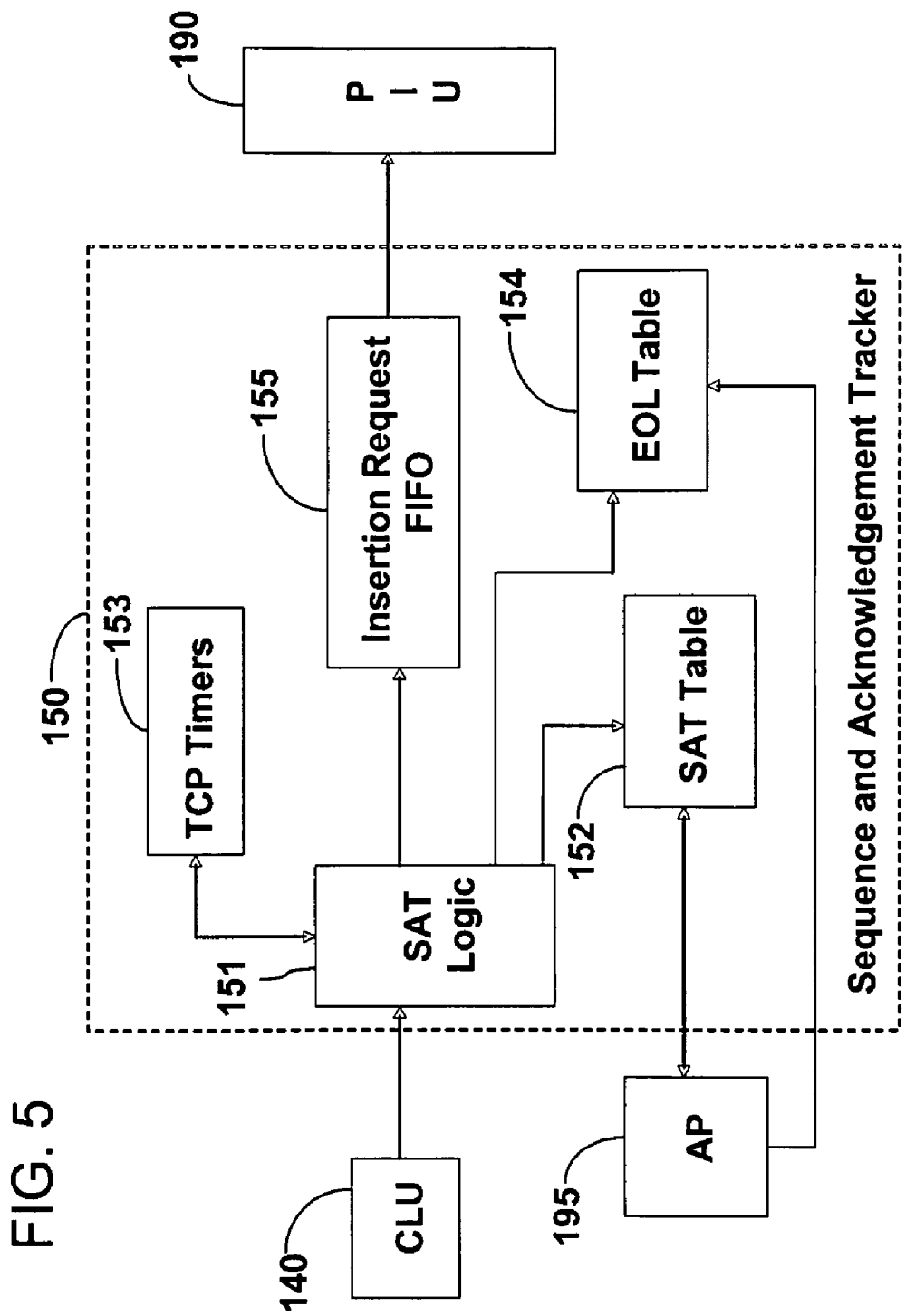
FIG. 5 is a block diagram of an exemplary embodiment of the sequence and acknowledgement tracker shown in FIG. 1.

For connection-oriented (e.g., TCP/IP) traffic, SAT 150 provides an efficient way of tracking data packet sequence numbers and related acknowledgement events. FIG. 5 is a block diagram of SAT 150. SAT 150 includes circuitry for performing transport layer processing. A SAT Table 152 provides a control mechanism for each datagram. In addition, a timer table 153 is allocated to store the TCP protocol specific running time counters for each connection. The valid entries in the timer table 153 are updated periodically. Whenever a timer expires, a special TCP event is triggered. Both the SAT table 152 and Timer Table 153 are addressed by the Connection Identification number (CID), derived from the incoming packet by lookup. Another table, called Expected Object Length (EOL) 154 is also maintained in SAT 150. EOL table 154 is addressed by CID and identifies the remaining object length to be received for each CID.

Table 1 includes field definitions for an exemplary embodiment of SAT table 152.

TABLE 1

SAT Table

| Table Name | Bit Position | Field | Description |
| --- | --- | --- | --- |
| SAT Table[CID] | 31:0 | SeqNumRx | The Sequence Number To be Received: The next sequence number expected for receive data path. It is updated by SAT 150 as a packet is received. |
| | 31:0 | AckNumRx | The ACK Number Received:The latest ACK sequence number received for transmit data path. It shows the sequence number last acknowledged by a receiver. It is updated by SAT 150 as a packet is received. |
| | 31:16 | AckBytCnt | The ACKed Byte Counter: This counter counts the number of bytes ACKed. In con-gestion avoidance mode, when this count reaches Window_Cong, Window_Cong is incremented by TCP_SegSize. It is updated by SAT 150 as a packet is received. |
| | 15:4 | VarRTT | The Round Trip Time Variation:This field maintains the round trip time variation to assist the calculation of re-transmission timeout value. When an ACK packet is received, and round trip time is sampled. The round trip time variation is calculated as following: $DevRTT = (1 - \beta) DevRTT + \beta \lvert SRTT - \text{Sampled RTT} \rvert$. Initislization is performed by software to SRTT/2. The field only holds the truncated value of real RTT variation. |
| | 3 | FRACKEnb | Fast Retransmission Enable:This bit is used by AP 195 to enable ULP for fast retransmission. When this bit is set and ACK Enable is set, ULP will insert a (duplicate) ACK packet whenever it receives a out-of-sequence packet. Default to 0. |
| | 2 | ACkEnb | ACK Enable:This bit is used by AP 195 to enable ULP for acknowledgment packet generation or insert ACK number in a outgoing packet. Typically, it is set to 1 after a connection has been established and HNAS is expecting media data.This field is set by AP 195. |
| | 1 | BPEnb | Backpressure Enable: When set, ULP is allowed to generate per connection backpressure to TMA.This field is set by AP 195. |
| | 0 | L4Prt | Layer4 Protocol: 0:TCP, 1:UDP. This field is set by AP 195. |
| | 31 | RcdTmsV | The Recorded Transmit Timestamp Valid:This field indicates if Rcrd_Tx_timestamp is valid. It is set to be valid whenever a packet is transmitted and the field was not valid. This field is reset to invalid when a RTT is sampled. It is maintained by SAT. |
| | 30:0 | RcdTmstp | The Recorded Transmit Timestamp This field records the time when a packet is transmitted. This field is set whenever the valid flag is set. This field is used to calculate RTT. It is maintained by SAT. |

TABLE 1-continued

SAT Table

| Table Name | Bit Position | Field | Description |
|---|---|---|---|
| | 31:0 | AvgRTT | The Averaged Round Trip Time: This field maintains the averaged round trip time for the connection. When an ACK packet is received, a round trip time is sampled and the averaged round trip timer is updated based on following equation: Avg RTT = a * Avg RTT + (1 − a) *Sampled RTT. Initialization is performed by software. |
| | 31:0 | SeqNumTx | The Sequence Number to Transmit:This 32-bit field is used to store the sequence number to be sent next. It is set initially by AP 195 and updated by ULP as packets are forwarded to GEC block. |
| | 31:0 | RcdSeq | The Record Sequence Number: This field records sequence number of a transmitted packet. This field is set whenever the valid flag is set. This field is used to val-idate the ACK packet for RTT calculation. It is maintained by SAT. |
| | 31:27 | Reserved | Reserved: |
| | 26:16 | TCPSegSize | The TCP Segment Size: This field specifies the maximum TCP packet size for each connection. It is used for TCP congestion control. This register is set by AP 195. |
| | 15:0 | SSThresh | The Slow Start Threshold: This field contains the threshold value for TCP slow start and congestion avoidance. When congestion window exceeds this threshold, TCP congestion control enters congestion avoidance mode. This register is set by AP 195. |
| | 31:16 | CongWind | The Congestion Window Size:The window size derived based on congestion condition. AP 195 is responsible for the calcu-lation of this value. |
| | 15:0 | RxWind | The Received Window Size:The latest windows size received. It indicates the sender's data buffer size. This number is used to determine if a connection needs to be backpressured in the transmit direction. It is maintained by SAT. |

Once a connection has been set up by AP 195, and SAT 150 is enabled, SAT 150 offloads most of the TCP operations from AP 195. Operations of SAT 150 are summarized as follows. For each received packet, SAT 150:

Updates the next sequence number expected in SEQ_Rx field.

Records the latest received acknowledgement sequence number in an ACK_Rx field.

Detects any out-of-sequence packets and reports them to AP 195.

Records the receiver window.

Sets the delay ACK Timer

Resets the re-transmit packet timer when the proper ACK packet is received.

Samples the round trip time and updates the averaged RTT when an ACK packet is received.

Discontinues the backpressure signal to a given connection to TMA 200 due to a newly received ACK packet when appropriate to resume packet transmission.

Updates the congestion windows.

Additionally, for each transmitted packet, SAT 150:

Loads the proper sequence number to each outgoing packet from its SEQ_Tx field when enabled.

Piggybacks the acknowledgement number to the outgoing packet from its SEQ_Rx field when enabled and a new ACK is appropriate.

Records the time and sequence number of the transmitting packet when appropriate.

Inserts a dedicated ACK packet when appropriate.

Applies a backpressure signal to TMA 200, when appropriate, to stop further packet transmission.

Sets the re-transmit packet timer.

SAT Operation for Data Reception

After a connection has been established by AP 195, when ULP accelerator 100 receives a packet, CLU 140 derives the CID Number and, assuming no connection lookup error, sends to SAT 150 the following parameters:

CID (Connection Identification Number)

Packet_Length_Rx: the L4 packet length

SEQ Number: 32 bit received packet sequence number

ACK Number: 32 bit received packet acknowledgement number

Received Window Size

TCP Code Bits extracted from the header

SAT logic 151 reads out an entry from SAT table 152 addressed by the CID. The connection's SEQ_Rx, ACK_Rx, and Window_Rx are updated accordingly. Both sequence and ACK number from the packet are checked against SEQ_Rx and ACK_Rx. Out-of-sequence errors are reported to AP 195. When a packet with the correct sequence number is received, SEQ_Rx is incremented by the received packet length. The acknowledgement number and Window value from the packet are recorded in the ACK_Rx and Window_Rx fields. The number of bytes acknowledged by this packet is derived. The accumulated ACKed byte count is incremented. If ULP accelerator 100 is operating in congestion avoidance mode, such count is used to determine whether the congestion window size should be incremented.

In order to reduce the ACK packet bandwidth, delayed acknowledgement is used. Once a packet is received and the delayed ACK timer is inactive, a delayed ACK timer 153 (refer below to SAT Timer Operations) is actuated with an ACK timer value set by AP 195 and the timer starts counting down. If a packet is received for an active ACK timer, the timer value is set to zero to expedite an ACK insertion. When the timer expires, a dedicated ACK packet is sent to the sender. However, before an ACK packet is inserted, any outgoing packet for the same connection will reset the timer, because the packet will carry an ACK number.

When a proper ACK packet is received, the active re-transmit timer is reset and the round trip time (RTT) is sampled. In addition, the averaged RTT is updated according to Equation (2) above. Then, the updated entries are written back. As a consequence of updated ACK_Rx number, the backpressure status of the connection is checked and updated. Details of the ACK packet delayed timing are described in the exemplary SAT pseudo code, below.

SAT Operations for Data Transmission

There are three sources that could initiate data transmission. (1) AP 195 can insert packets for any of various reasons. (2) TMA 200 can stream data from disk array 196. (3) ULP accelerator 100 can insert an ACK packet when a delayed ACK timer expires. In the first two cases, data are forwarded to ULP accelerator 100 from TMA 200. In the last case, the data forwarding request comes from the ACK insertion FIFO 155 in SAT 150.

In some situations, more than one source can require data transfer at the same time. When such a collision occurs, an ACK request has higher priority than a regular data request. An ACK request will be sent as soon as any in-process packet transfer has completed.

When ULP accelerator 100 receives a packet for transmission, TCP related header fields are updated for the outgoing packet. The value in SEQTx field is written into the Sequence Number field of the packet. Then SEQTx is increased by the transmitted packet length. If ACK is enabled, the value from SEQ_Rx field is written into the Acknowledgement Number field, and the ACK bit in the packet is marked. In addition, current time and packet sequence number are recorded in SAT table 152 to measure the round trip time.

When a packet is transmitted, backpressure status for the connection is also checked and adjusted.

Details of the SAT operation for data transmission are shown in the SAT pseudo code below.

SAT Timer Operations

The SAT maintains two timing counters per connection within timer block 153: a delayed ACK timer and a retransmission timer. These timers are used to trigger certain TCP operations periodically. The timers 153 for each connection are accessed and updated sequentially on a fixed schedule. Each time, only one connection's timers are updated in order to avoid having timers from multiple connections expire at the same time. Table 2 includes a layout of an exemplary embodiment of Timer Table 153. Table 3 includes field definitions for the exemplary Timer Table 153 shown in Table 2.

TABLE 2

Timer Table

| Words | Rx | Tx | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|---|---|
| 0 | | | V | The Packet Retransmit Timeout Counter ||||||||||||||||
| 1 | RW | R | E | The Packet Retransmit Timeout ||||||||||||||||
| 2 | | | V | The Delay ACK Timeout Counter ||||||||||||||||
| 3 | R | | R | The Delay ACK Timeout ||||||||||||||||

| | Words | Rx | Tx | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|
| | 0 | | | The Packet Retransmit Timeout Counter ||||||||||||||||
| | 1 | RW | R | The Packet Retransmit Timeout ||||||||||||||||
| | 2 | | | The Delay ACK Timeout Counter ||||||||||||||||
| | 3 | R | | The Delay ACK Timeout ||||||||||||||||

TABLE 3

Timer Table Fields

| Name of Field | Size (bits) | Description |
|---|---|---|
| Delay_ACK_Timer | 1 | The Delay ACK Timer Valid:This flag indicates if the Delay_ACK_Timer is valid. This flag is set tobe valid when a packet is received on the connection and the field was not valid. The flag is reset to invalid when a packet carrying an ACK flag is transmitted or when an ACK packet insertion request is issued. |
| | 31 | The Delay ACK Time Count: This field is loaded with the value from Delay_ACK_Time field when the valid flag is set. It is counted down periodically. When the counter reaches to zero, a ACK packet insertion request is issued |
| Delay_ACK_Timeout | 31 | The Delay ACK Timeout:This field contains the maximum allowed time difference between two consecutive ACK packet. It is used to set delay ACK time counter.This field is configured by AP 195. |
| Re_Tx_Timer | 1 | The Retransmit Packet Timer Valid: This flag is set to be valid when a packet is transmitted and the field was not valid. The flag is reset to invalid when all outstanding packets have been ACKed. |
| | 31 | The Retransmit Packet Timer Counter: This field is loaded with the value from Re_Tx_Time field when either the valid flag is set or a non duplicative ACK |

TABLE 3-continued

Timer Table Fields

| Name of Field | Size (bits) | Description |
|---|---|---|
| | | packet is received. The field is counted down periodically when the valid bit is set. When the counter reaches to zero, a packet re-transmission request is issued to AP 195. |
| RTO_Upd_Enb | 1 | RTO Update Enable Bit:This bit enables/dis-ables the hardware update of RxTmValue. When set, ULP SAT will update the RXTmrValue accord-ing to following formula: RTO = SRTT + max(G, k*RTTVar). Otherwise, it will leave AP 195 to set the value.This bit is set by AP 195. The default value is 0. |
| Re_Tx_Timeout | 31 | The Packet Re-Transmit Timeout: This field specifies the maximum time a sender should wait before it re-transmit a packet. Its value is used to set packet re-transmit time counter. This field is updated by AP 195 based on averaged RTT. |

In order to support different timing granularities, a time counter is decremented by a fixed, but, programmable value for each update. When a timer counts down to zero or below zero, a special TCP operation (either ACK packet insertion or a packet retransmission), is triggered. The periodic update of the timers 153 is independent of packet transmission and reception. However, a received or transmitted packet may reset an individual connection's timer.

The temporal interval for each timer update is determined by traffic bandwidth and the required response time. In some embodiments, the temporal interval is programmable. In one example, the minimum update interval for the timers for one connection is 25.6 microsecond, but other update intervals may be used for other embodiments.

TCP Code Bit Handling

SAT 150 is provided with TCP code bits for each received packet. SAT 150 is responsible for setting/modifying the TCP code bits for each transmitted packet. For each received packet, SAT 150 detects the status of the TCP code bits (URG, ACK, PSH, RST, SYN, FIN). Depending on the configuration, SAT 150 may send the packet to AP 195 based on TCP code bit status. SAT 150 also uses the ACK flag to decide if various ACK related operations should be performed. For each outgoing packet, SAT 150 sets the ACK flag in the TCP code bits field when enabled.

Congestion Handling and Slow-Start with TCP

In an exemplary embodiment, ULP accelerator 100 maintains two windows when transmitting data, to limit the amount of data ULP accelerator 100 can send: a receiver window, (Window_Rx) and a congestion window (Window_Cong). The receiver window directly reflects the receiver's advertised available buffer size, and is extracted from incoming ACK packet sent by the traffic receiver to HNAS 10. The congestion window is another limit calculated by the traffic sender (HNAS 10) based on its estimation of network congestion situation between sender and receiver. TCP protocol requires that, at any given time, a sender should not send data with a sequence number higher than the sum of the highest acknowledged sequence number and the minimum of window Rx and Window_Cong. Some embodiments include a method for adjusting a transport control protocol (TCP) congestion window size. This section describes how ULP accelerator 100 dynamically updates the congestion window according to a TCP slow start and congestion avoidance scheme.

In some embodiments, software in AP 195 provides means for setting the TCP congestion window size to an initial value at the beginning of a TCP data transmission, and SAT 150 provides means, described below, for increasing the TCP congestion window size by the programmable congestion window increment value when an acknowledgement packet is received.

According to this procedure, ULP accelerator 100 slowly, dynamically increases the Window_Cong size based on its probe of available network capacity. During this slow start stage, ULP accelerator 100 increases Window_Cong by N times the TCP segment size for every received non-duplicative ACK packet. Note that in ULP accelerator 100, a programmable parameter N, instead of a fixed value (i.e., one), is used to avoid inefficiency during slow start in a high speed network. Preferably, the integer N is stored in a register and defaults to 1.

The slow start procedure continues, until either Window_Cong exceeds a preset threshold, in which ULP accelerator 100 enters congestion avoidance state, or the connection's retransmission timer expires, in which case ULP accelerator 100 enters the congestion state.

During the congestion avoidance stage, ULP accelerator 100 increments Window_Cong by one segment size per round trip time. The congestion avoidance stage continues until congestion is detected (i.e., until a retransmit timer runs out without receipt of an ACK).

At congestion state, ULP sends an interrupt to AP 195. AP 195 will reset the Window_Cong. Usually, the new value of Window_Cong is either half of the old value (multiplicative reduction) or one segment size.

Figure 4:
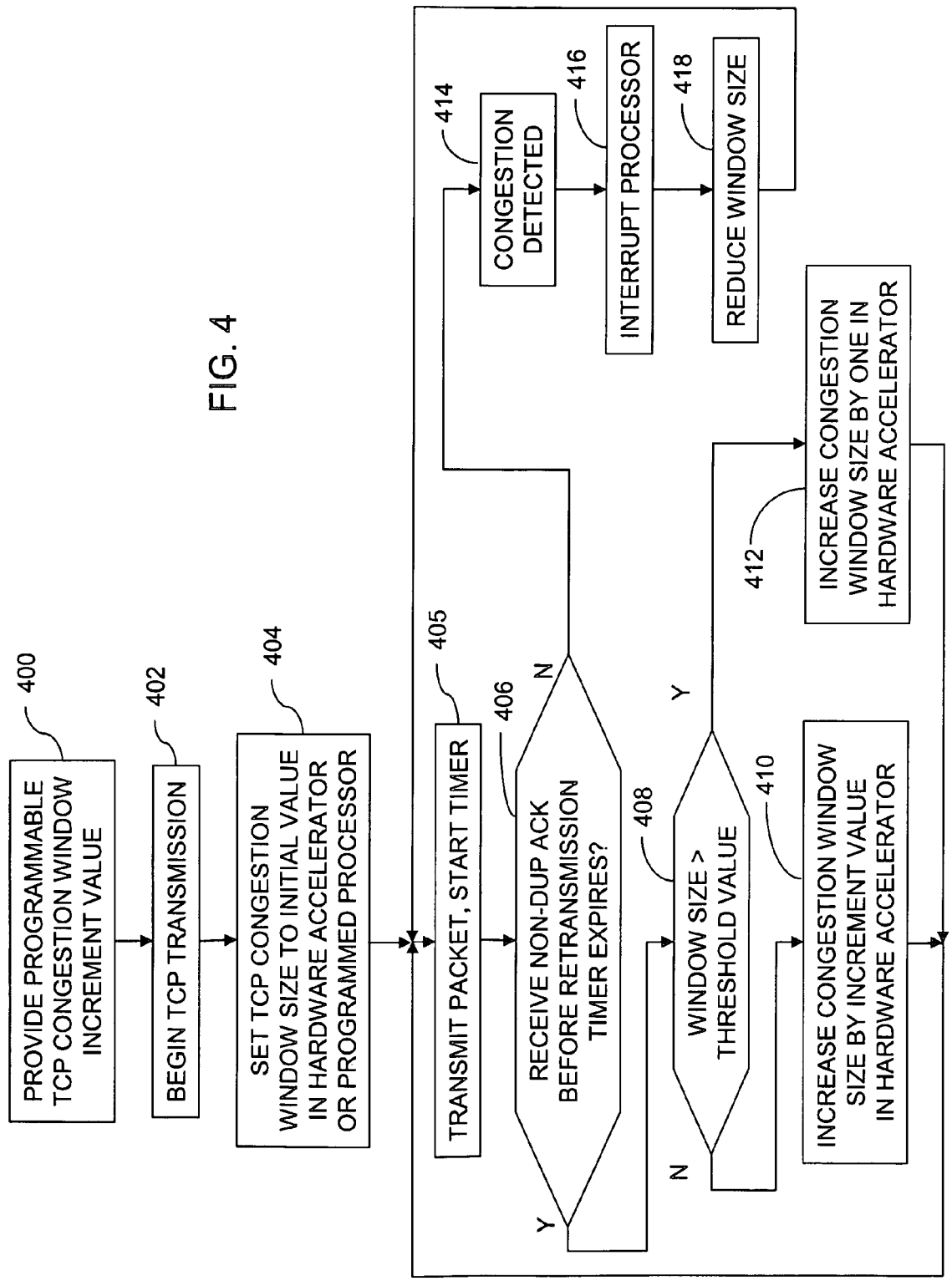
FIG. 4 is a flow chart of a slow start, congestion avoidance and congestion handling procedure.

FIG. 4 is a flow chart of an exemplary TCP congestion window adjustment method, including slow start, congestion avoidance, and congestion handling.

At step 400, AP 195 provides a programmable congestion window increment value Window_Cong.

At step 402, a TCP transmission begins.

At step 404, ULP accelerator 100 or AP 195 sets the TCP congestion window size to the initial value Window_Cong at the beginning of a TCP data transmission. According to the slow start procedure, this initial value is not greater than four TCP segments.

At step 405, ULP accelerator 100 transmits at least one packet and starts a retransmission timer. If an acknowledgement (ACK) is not received before the retransmission timer expires, ULP accelerator 100 will retransmit the packet.

At step 406, ULP accelerator 100 determines whether a non-duplicative ACK is received before the retransmission timer expires. If the ACK is received, step 408 is executed. If No non-duplicative ACK is received, step 414 is executed.

At step 408, ULP accelerator 100 determines whether the window size is greater than a threshold value. If the window size greater than the threshold value, step 412 is executed.

If the window size is less than or equal to the threshold value, step 410 is executed.

At step 410, ULP accelerator 100 increases the TCP congestion window size by the programmable congestion window increment value when an acknowledgement packet is received. The programmable congestion window increment value is preferably an integer greater than 1. After step 410, the loop beginning at step 405 is repeated.

At step 412, if the window size is greater than the threshold value, then ULP accelerator 100 enters the congestion avoidance mode, and only increases the congestion window size by one segment for every RTT time. After step 412, each time the loop beginning at step 405 is repeated, the congestion window size is only increased by one, until congestion is detected.

At step 414, when the retransmission timer expires before ULP accelerator 100 receives a non-duplicative ACK, congestion is detected.

At step 416, ULP accelerator 100 sends an interrupt signal to AP 195.

At step 418, AP 195 reduces the congestion window size. After step 418, the loop beginning at step 405 is repeated.

The slow start and congestion algorithm is summarized in following pseudo code.

```
// for each non duplicative ACK packet, perform the following
// Slow start algorithm
if (Window_Cong<Slow_Start_Thresh)
    Window_Cong+=N X TCP_SegSize;
// Congestion Avoidance algorithm
else if (newly_ACK_Byte_cnt>Window_Cong)
    Window_Cong+=TCP_SegSize;
    Newly_ACK_Byte_cnt-=Window_Cong;
```

SAT operation is described in the following pseudocode:

After AP 195 initializes all related fields in the SAT, it set the Conn_Lck to zero. The pseudo-code when A packet is received:

```
Input:
    CID: connection derived by lookup.
    Packet_Length_Rx: The L4 packet length.
    SEQ_Number: The TCP Sequence number from arriving packet.
    ACK_Number: The TCP ACK number from arriving packet.
    Window: The TCP Received window size from arriving packet.
    TCp_Code: The TCP code word from arriving packet.
    Option: Either TCP or IP options flag from arriving packet.
    PayloadLen the L4 payload length
Output:
    Drop: Packet drop flag based on TCP processing
    To_AP 195: packet reroute to AP 195 with default QID flag
    OOorder packet Out of order flag
    TCP_code_set: TCP code set flag
    End_of_Obj: The end of object flag
SAT_Rx_Operation(CID, Packet_Length_Rx, SEQ_Number, ACK_Number, Window, TCP_Code,
Option, Payloadlen)
{
    if (SAT [CID].L4_Protocol == TCP)
    {
        // update the to be received sequence number SEQ_Rx number
        if (SEQ_Number == SAT [CID] .SEQ_Rx)
            SAT [CID] .SEQ_Rx = SEQ_Rx + Payloadlen;
            SAT [CID] .New_ACK = TRUE;
        else
            StatusReg . OOOrderErr = TRUE;
        // updates the ACK sequence number in ACK_Rx field
        if (TCP_Code.ACK == TRUE)
        {
            if (Option == TRUE and Payloadlen == 0)
                StatusReg.OptACKErr= TRUE;
                if (ACK_number > SAT [CID] .Seq_Tx)
                    StatusReg.OutWinErr=TRUE;
                else if (PayloadLen == 0 AND ACK_number <=SAT [CID] .ACK_Rx)
                    StatusReg.DupACKErr= TRUE;
            else // {ACK_number >SAT [CID] .ACK_Rx)
            {
                // calculate the number of new byte ACKed
                new_ACK_byte = ACK_number - SAT [CID] .ACK_Rx;
                // update the ACK value
                SAT [CID] .ACK_Rx = ACK_Number;
                // Samples the RTT & update avg RTT when a ACK is received.
                if (SAT [CID] .Rcd_Tmsp.V == TRUE && ACK_number >=
                SAT [CID] .Rcd_Seq)
                {
                    Sampled_RTT = RTC - SAT [CID] .Rcd_Tmsp;
                    -- shift up by 11 bits
                    varRTT = SAT [CID] .Var_RTT << 11;
                    varRTT = (1-®) *VarRTT + ®*| SAT [CID] .Avg_RTT -
                    Sampled_RTT|
                    if (varRTT > 0x7FFFFF)
                        varRTT = 0x7FFFF;
                    SAT [CID] .Var_RTT = varRTT [22:11];
                    SAT [CID] .Avg_RTT = 2(-alpha) * (Sampled_RTT -
                    SAT [CID] .Avg_RTT) + SAT [CID] .Avg_RTT;
                    if (SAT [CID] .Avg_RTT > 0xFFFFFFFF) {
                    SAT [CID] .Avg_RTT > 0xFFFFFFFF;
                    };
                    SAT [CID] .Rcd_Tmsp.V = FALSE;
                    if (Re_Tx_timer [CID] .Udp_Enb) {
                        Re_Tx_Timer [CID] .Val = SAT [CID] .Avg_RTT
                            + SAT [CID] .Var_RTT << 13;
                    }
                }
                // turn off Re-Tx timer when all outstanding packet been
```

```
            ACKed
            if (SAT [CID] .ACK_Rx == SAT [CID] .Tx_Seq)
                Re_Tx_Timer [CID] .V = FALSE;
            // reset the re-Tx timer for every new ACK packet
            else
                Re_Tx_Timer [CID] .Counter = Re_Tx_Timer [CID] .Val;
            // Update the Congestion Window: Window_Cong
            if (!StatusReg.OOOrderErr) {
                // The connection is not congested
                if (!Cong_Lock [CID]) {
                    // Slow Start
                    if (SAT [CID] .Window_Cong< SAT [CID}.ssThresh)
                        SAT [CID] .Window_Cong += 2N *
                        SAT [CID] .SegSize;
                        // avoid overflow
                        if (SAT [CID] .Window_Cong > 0xFFFF)
                            SAT [CID] .Window_Cong = 0xFFFF;
                    SAT [CID] .Net_ACK_Byte =0;
                    // congestion avoidance
                    else {
                        SAT [CID] .Net_ACK_Byte += new_ACK_byte;
                        if (SAT [CID] .Net_ACK_Byte >=
                                SAT [CID] .Window_Cong) {
                            SAT [CID] .Net_ACK_Byte -=
                            SAT [CID] .Window_Cong;
                            SAT [CID] .Window_Cong +=
                            SAT [CID} .SegSize;
                            // avoid overflow
                            if (SAT [CID] .Window_Cong > 0xFFFF)
                                SAT [CID] .Window_Cong = 0xFFFF;
                        }
                    }
                }
            }
        } // end of ACK_Valid operation
    // Update the receiver window: Window_Rx
    SAT [CID] .Window_Rx = Window;
    // update backpressure status
    if (SAT [CID] .BP_Enb == TRUE &&
        (SAT [CID] .SEQ_Tx - SAT [CID] .ACK_Rx) <=
            min(Window, SAT [CID] .Window_Cong) ) - 2 X SAT [CID] .SegSize)
        ulp_tma_bp = 0x2 --- release backpressure
    else if (SAT [CID] .BP_Enb == TRUE &&
        (SAT [CID] .SEQ_Tx - SAT [CID] .ACK_Rx) <=
            min(Window, SAT [CID] .Window_Cong) ) - SAT [CID] .SegSize)
        ulp_tma_bp = 0x1 --- release backpressure for only 1 packet
    else if (SAT [CID] .BP_Enb == FALSE)
        ulp_tma_bp = 0x2 --- release backpressure
    else
        ulp_tma_bp = 0x0 --- no BP status change
    // set the delay ACk timer
    if (Drop == FLASE && To_AP 195 == FALSE && AND SAT [CID] .ACK_Enb == TRUE)
    {
        if (Delay_ACK_Timer .V == FALSE && TCP_Code .PSH == FALSE)
            {
        Delay_ACK_Timer .V = TRUE;
        Delay_ACK_Timer .Count = SAT [CID] .Delay_ACK_Time;
        }
        // generate an ACK packet for every other packet received
        else
            Delay_ACK_Timer .Count = 0;
    };
    // send out duplicate ACk packet for Out-of-order packet received
    else if (SAT [CID] .ACK_Enb == TRUE &&
        SAT [CID] .FRACK_Enb == TRUE && OOOrderErr == TRUE)
        {
            Delay_ACK_Timer .Count = 0;
        };
    };
}// end of TCP operation
// update the EoL table
if (EoL [CID] .V== TRUE && (SAT [CID] .L4_Protocol == UDP ||
    SAT [CID] .L4_Protocol == TCP &&
    !OOOrderErr && !OutWinErr && !DupACKErr && !Tcp_Code_Set) {
    if (EoL [CID] .ObjLen <= Payload_Len)
        StatusReg.EOBlen = TRUE;
        EoL [CID] .ObjLen = 0;
    else
        EoL[CID] .ObjLen -= Payload_Len;
```

```
    }
    // produce output signals
    To_AP 195 = OOOrderErr & TCP_Cfg_Reg .OOOrder |
        OutWinErr & TCP_Cfg_Reg.OutWin |
        DupACKErr & TCP_Cfg.Reg.DupAck |
        OptACKErr & TCP_Cfg.Reg.OptACK |
        TCP_Code.Urg & Tcp_Cfg_Reg.Urg & and (Payloadlen == 0) |
        TCP_Code.Ack & Tcp_Cfg_Reg.Ack & and (Payloadlen == 0) |
        TCP_Code.Psh & Tcp_cfg_Reg.Psh & and (Payloadlen == 0) |
        TCP_Code.Rst & Tcp_Cfg_Reg.Rst & and (Payloadlen == 0) |
        TCP_Code.Syn & Tcp_Cfg_Reg.Syn & and (Payloadlen == 0) |
        TCP_Code.Fin & Tcp_Cfg_Reg.Fin & and (Payloadlen == 0);
    Drop = OOOrderErr & !TCP_Cfg_Reg.OOOrder |
        OutWinErr & !TCP_Cfg_Reg.OutWin |
        DupACKErr & !TCP_Cfg.Reg.DupAck |
        OptACKErr & !TCP_Cfg.Reg.OptACK |
        TCP_Code.Urg & !Tcp_Cfg_Reg.Urg & and (Payloadlen == 0) |
        TCP_Code.Ack & !Tcp_Cfg_Reg.Ack & and (Payloadlen == 0) |
        TCP_Code.Psh & !Tcp_cfg_Reg.Psh & and (Payloadlen= = 0) |
        TCP_Code.Rst & !Tcp_Cfg_Reg.Rst & and (Payloadlen == 0) |
        TCP_Code.Syn & !Tcp_Cfg_Reg.Syn & and (Payloadlen == 0) |
        TCP_Code.Fin & !Tcp_Cfg_Reg.Fin & and (Payloadlen == 0);
    Tcp_Code_Set = TCP_Code.Urg | TCP_Code.Rst | TCP_Code.Syn | TCP_Code.Fin;
}
Assume follow registers are employed:
    T_Clk: a clock counter is used which increment for each clock.
    Tmr_Updt_Int: a timer update interval.
    Tmr_Updt_Amnt: amount for each timer update
Timer_Update_Operation(T_Clk, Tmr_Updt_Int, Tmr_Updt_Amnt)
{
    // only update one timer every $2_{Tmr\_updt\_Int}$ clocks
    if (mod (T_Clk, $2_{Tmr\_updt\_Int}$) == 0) {
        CID = Mod((T_Clk >> Tmr_Updt_Int), 64);
        if (Delay_ACK_Timer [CID] .V == TRUE) {
            if (Delay_ACK_Timer.Count > Tmr_Updt_Amnt)
                Delay_ACK_Timer [CID].Count -= Tmr_Updt_Amnt;
            // timer expires, insert an ACK packet
            else {
                ACK_FIFO [Tail] = CID;
                Delay_ACK_Timer.V = FALSE;
                ACK_In_FIFO [CID] = TRUE;
            }
        }
        if (Re_Tx_Timer [CID] .V == TRUE) {
            if (Re_Tx_Timer [CID] .Count > Tmr_Updt_Amnt)
                Rx_Tx_Timer [CID] .Count -= Tmr_Updt_Amnt;
            // Packet re-transmission case.
            // In this case, AP 195 should do following thing:
            // Notify TMA for packet retransmission
            // reset Window_Cong,and reset Cong_Lock
            else {
                StatusReg.Retrans_Timeout = TRUE;
                Re_Tx_Timer.V = FALSE;
                Cong_Lock [CID] = TRUE;
            }
        }
    }
    RTC += $2_{Tmr\_updt\_Int}$;
}
// ACK_Ins_Flag indicates if the packet is from ACK insertion FIFO or not.
SAT_Tx_Operation(CID, Packet, ACK_Ins_Flag)
{
    // load the proper Seq to outgoing packet from its SEQ_Tx before it is
    updated
    Packet_Sequence Number = SAT [CID] .SEQ_Tx;
    SAT [CID] .SEQ_Tx += Payload_Length_Tx;
    // Piggybacks the ACK number to outgoing packet from its ACK_Tx field
    when enabled.
    if (SAT [CID] .ACK_Enb == TRUE) {
        if ( ( !ACK_Ins_Flag && !ACK_In_FIFO [CID]) // Piggybacks the ACK
            number
            ||ACK_Ins_Flag) // An inserted ACK packet
        {
            Packet_ACK_Number = SAT [CID] .SEQ_Rx;
            Packet_Code_ACK =1;
            // invalid the delay ACK timer
            Delay_ACK_Timer.V = 0;
            ACK_In_FIFO [CID] = FALSE;
            // avoid multiple ACK being sent out
            SAT[CID] .New_ACK = FALSE;
        }
```

```
}
// Mark the TCP PUSH bit when enabled or instructed by TMA
if (RTPS [CID] == 1 or Packet.EoQ == 1) {
Packet_Code_PSH = 1;
}
// update the backpressure status for the CID
if (SAT [CID] .BP_Enb== TRUE &&
    (SAT [CID] .SEQ_Tx - SAT [CID] .ACK_Rx) >=
        min(SAT [CID] .Windom_Rx, SAT [CID] .Window_Cong) - SAT [CID] .SegSize)
        ulp_tma_bp = 0x3; // apply backpressure
else if (SAT [CID] .BP_Enb == FALSE)
        ulp_tma_bp = 0x2; // release backpressure
else
        ulp_tma_bp = 0x0; // no backpressure status change
// Records the time packet transmitted when necessary.
if (SAT [CID] .Rcd_Tmsp.V == FALSE)
{
    SAT [CID] .Rcd_Tmsp.V = TRUE;
    SAT [CID] .Rcd_Tmsp = RTC;
    SAT [CID] .Rcd_Seq = Packet_Sequence Number;
}
// Actuate the Re-transmit Timer
if (Re_Tx_Timer.V == FALSE) {
    Re_Tx_Timer.V= TRUE;
    Re_Tx_Timer.Count= SAT [CID] .Re_Tx_Time;
}
}
```

In some embodiments, protocol accelerator 100 is implemented in application specific integrated circuitry (ASIC). In some embodiments, the ASIC is designed manually. In some embodiments, a computer readable medium is encoded with pesudocode, wherein, when the pseudocode is processed by a processor, the processor generates GDSII data for fabricating an application specific integrated circuit that performs a method. An example of a suitable software program suitable for generating the GDSII data is "ASTRO" by Synopsys, Inc. of Mountain View, Calif.

In other embodiments, the invention may be embodied in a system having one or more programmable processors and/or coprocessors. The present invention, in sum or in part, can also be embodied in the form of program code embodied in tangible media, such as floppy diskettes, CD-ROMs, hard-drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber-optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method comprising the steps of:
   (a) extracting, by a hardware protocol accelerator of a receiver, a queue identifier from at least one incoming packet received at the receiver, said queue identifier associated with a first buffer queue for transport layer processing of the incoming packet;
   (b) identifying each packet having an error or condition such that the protocol accelerator cannot perform the transport layer processing on the identified packet;
   (c) interrupting a programmed processor of the receiver; and
   (d) storing the identified packet in a second buffer queue reserved for packets identified in step (b), for transport layer processing by the programmed processor in response to the interrupt, while
   (e) continuing storage of other packets into the first buffer queue and transport layer processing of packets in the first buffer queue by the hardware protocol accelerator.

2. The method of claim 1, wherein:
   step (a) includes storing a plurality of packets in the first buffer queue for transport layer processing by the protocol accelerator, the plurality of packets belonging to a single data transfer,
   the identified packet belongs to the same single data transfer.

3. The method of claim 1, further comprising:
   setting a flag in the packet to identify to the processor a type of lookup error identified in step (b).

4. The method of claim 1, further comprising:
   extracting transport layer protocol information from the packet in the processor;
   determining a queue identifier of the first buffer into which the identified packet is to be stored, the determining step performed by the processor; and
   modifying a record of a content addressable memory to identify the queue identifier of the first buffer in which the identified packet is stored, for transport layer processing of a later received packet related to the identified packet by the protocol accelerator.

5. The method of claim 1, wherein step (a) includes using a content addressable memory to extract the queue identifier.

6. The method of claim 3, wherein step (b) includes identifying a packet for which a lookup error occurs while attempting to extract a queue identifier therefrom, or for which a matching queue identifier is not present in the content addressable memory, or which is received out of sequence.

7. The method of claim 6, wherein step (d) includes:
    storing the packet in a lookup-error buffer queue if the lookup error occurs while attempting to extract the queue identifier therefrom,
    storing the packet in a CAM-miss buffer queue if the matching queue identifier is not present in the content addressable memory, and
    storing the packet in an out-of-sequence buffer queue if the packet is received out of sequence.

8. A method comprising the steps of:
    (a) setting a value of a field in a register of a hardware transmission control protocol (TCP) accelerator to one of a first value and a second value;
    (b) performing a TCP computation of a TCP retransmission timeout value in the hardware TCP accelerator if the value of the field is set to the first value; and
    (c) performing the TCP computation of the TCP retransmission timeout value in a programmed processor if the value of the field is set to the second value.

9. The method of claim 8, wherein step (b) is performed by an application specific integrated circuit in real time.

10. The method of claim 8, wherein the programmed processor performs step (a).

11. The method of claim 8, wherein:
    step (a) comprises initially setting the value of the field to the first value,
    step (b) includes performing the TCP computation in the protocol accelerator according to a first equation;
    step (c) includes performing the TCP computation in the programmed processor according to a second equation different from the first equation.

12. The method of claim 11, further comprising changing the value of the field from the first value to the second value in order to change an equation used for performing the TCP computation.

13. A method for adjusting a transport control protocol (TCP) congestion window size, comprising the steps of:
    providing a programmable congestion window increment value;
    a programmed processor setting the TCP congestion window size to an initial value at the beginning of a TCP data transmission; and
    a hardware TCP protocol accelerator increasing the TCP congestion window size by the programmable congestion window increment value when an acknowledgement packet is received.

14. The method of claim 13, wherein the increasing step is repeated each time a non duplicative acknowledgement packet is received until either:
    the TCP congestion window size exceeds a threshold value; or
    a retransmission timer associated with the TCP data transmission expires.

15. The method of claim 14, wherein when the TCP congestion window size exceeds the threshold value, the TCP congestion window size is increased by one when each subsequent non-duplicative acknowledgement packet is received, until congestion is detected.

16. The method of claim 15, further comprising:
    sending an interrupt to a programmed processor when the congestion is detected; and
    reducing the TCP congestion window size by the programmed processor in response to the interrupt.

17. The method of claim 14, further comprising:
    sending an interrupt to a programmed processor when a retransmission timer associated with the TCP data transmission expires; and
    reducing the TCP congestion window size by the programmed processor in response to the interrupt.

18. A receiver comprising:
    a first storage device portion containing index data for extracting a queue identifier corresponding to at least one incoming packet received at the receiver, the queue identifier used for identifying a first buffer queue in which the incoming packet is to be stored for transport layer processing;
    a hardware protocol accelerator for performing transport layer processing;
    means for identifying a packet having an error or condition such that the hardware protocol accelerator cannot perform the transport layer processing on the identified packet, and for generating and transmitting an interrupt signal to a programmed processor; and
    a second storage device portion including a second buffer queue for storing the identified packet, the second buffer queue reserved for storing packets identified by the identifying means, for transport layer processing by the programmed processor in response to the interrupt,
    wherein the receiver is capable of continuing storage of other packets into the first buffer queue, and the hardware protocol accelerator is capable of continuing transport layer processing of packets in the first buffer queue, while the programmed processor performs transport layer processing on the identified packet.

19. The receiver of claim 18, wherein:
    a plurality of packets are to be stored in the first buffer queue for transport layer processing by the hardware protocol accelerator, the plurality of packets belonging to a single data transfer, and
    the identified packet belongs to the same single data transfer.

20. The receiver of claim 18, further comprising:
    means for setting a flag in the packet to identify to the programmed processor a type of lookup error identified by the identifying means.

21. Apparatus comprising:
    a hardware transmission control protocol (TCP) accelerator having a register including a field that can be set to one of a first value and a second value; and
    means within the hardware TCP accelerator for performing a TCP computation of a TCP retransmission timeout value within the TCP accelerator if the value of the field is set to the first value,
    a programmed processor programmed to perform the TCP computation of the TCP retransmission timeout value if the value of the field is set to the second value.

22. The apparatus of claim 21, wherein:
    the computation performing means performs the TCP computation in the protocol accelerator according to a first equation;
    the programmed processor performs the TCP computation according to a second equation different from the first equation.

23. Apparatus for adjusting a transport control protocol (TCP) congestion window size, comprising:
    a first storage device portion for storing a programmable congestion window increment value;
    programmed means for setting the TCP congestion window size to an initial value at the beginning of a TCP data transmission; and a TCP protocol accelerator for increasing the TCP congestion window size by the programmable congestion window increment value when an acknowledgement packet is received.

24. The apparatus of claim 23, wherein the TCP protocol accelerator is implemented in an application specific integrated circuit.

25. The apparatus of claim 23, wherein the TCP protocol accelerator repeats the increasing each time a non-duplicative acknowledgement packet is received until either:
the TCP congestion window size exceeds a threshold value; or
a retransmission timer associated with the TCP data transmission expires.

26. The apparatus of claim 25, wherein when the TCP congestion window size exceeds the threshold value, the TCP congestion window size is increased by one when each subsequent non-duplicative acknowledgement packet is received, until congestion is detected.

27. A non-transitory tangible computer readable storage medium encoded with code, wherein, when the code is processed by a processor, the processor generates GDSIT data for fabricating an application specific integrated circuit that performs a method comprising the steps of:
(a) extracting a queue identifier from at least one incoming packet received at a receiver, for identifying a first buffer queue in which the incoming packet is to be stored for transport layer processing, the extracting and transport layer processing being performed by a hardware protocol accelerator;
(b) identifying a packet having an error or condition such that the hardware protocol accelerator cannot perform the transport layer processing on the identified packet;
(c) interrupting a programmed processor; and
(d) storing the identified packet in a second buffer queue reserved for packets identified in step (b), for transport layer processing by the programmed processor in response to the interrupt, while
(e) continuing storage of other packets into the first buffer queue and transport layer processing of packets in the first buffer queue by the hardware protocol accelerator.

28. The non-transitory tangible computer readable storage medium of claim 27, wherein:
step (a) includes storing a plurality of packets in the first buffer queue for transport layer processing by the protocol accelerator, the plurality of packets belonging to a single data transfer, the identified packet belongs to the same single data transfer.

29. The non-transitory tangible computer readable storage medium of claim 27, further comprising:
setting a flag in the packet to identify to the processor a type of lookup error identified in step (b).

30. A non-transitory tangible computer readable storage medium encoded with code, wherein, when the code is processed by a processor, the processor generates GDSII data for fabricating an application specific integrated circuit that performs a method comprising the steps of:
providing a programmable congestion window increment value;
a programmed processor setting the TCP congestion window size to an initial value at the beginning of a TCP data transmission; and a hardware protocol accelerator increasing the TCP congestion window size by the programmable congestion window increment value when an acknowledgement packet is received.

31. The non-transitory tangible computer readable storage medium of claim 30, wherein the increasing step is repeated each time a non-duplicative acknowledgement packet is received until either:
the TCP congestion window size exceeds a threshold value; or
a retransmission timer associated with the TCP data transmission expires.

32. The non-transitory tangible computer readable storage medium of claim 31, wherein when the TCP congestion window size exceeds the threshold value, the TCP congestion window size is increased by one when each subsequent non-duplicative acknowledgement packet is received, until congestion is detected.

33. The non-transitory tangible computer readable storage medium of claim 32, wherein the method further comprises:
sending an interrupt to a programmed processor when congestion is detected; and
reducing the TCP congestion window size by the programmed processor in response to the interrupt.

34. The non-transitory tangible computer readable storage medium of claim 31, wherein the method further comprises:
sending an interrupt to a programmed processor when a retransmission timer associated with the TCP data transmission expires; and
reducing the TCP congestion window size by the programmed processor in response to the interrupt.

35. The method of claim 1, wherein the at least one incoming packet is received at the receiver from a network interface.

36. The receiver of claim 18, wherein the at least one incoming packet is received at the receiver from a network interface.

37. The computer readable medium of claim 27, wherein the at least one incoming packet is received at the receiver from a network interface.

38. The method of claim 1, wherein step (b) identifies:
at least one packet for which a lookup error occurs while attempting to extract a queue identifier therefrom;
at least one packet having a queue identifier that is not present in content addressable memory; and
at least one packet that is received out of sequence.

39. The receiver of claim 18, wherein the means for identifying the packet having an error or condition is adapted to identify:
packets for which a lookup error occurs while attempting to extract a queue identifier therefrom;
packets having a queue identifier that is not present in the content addressable memory; and
packets that are received out of sequence.

40. The non-transitory tangible computer readable storage medium of claim 27, wherein step (b) identifies:
at least one packet for which a lookup error occurs while attempting to extract a queue identifier therefrom;
at least one packet having a queue identifier that is not present in the content addressable memory; and
at least one packet that is received out of sequence.

41. The method of claim 13, wherein the TCP congestion window size is increased by the programmable congestion window increment value during a slow start stage.

42. The apparatus of claim 23, wherein the TCP protocol accelerator increases the TCP congestion window size by the programmable congestion window increment value during a slow start stage.

43. The non-transitory tangible computer readable storage medium of claim 30, wherein the TCP protocol accelerator increases the TCP congestion window size by the programmable congestion window increment value during a slow start stage.

* * * * *